US008249294B2

(12) United States Patent
Koga

(10) Patent No.: US 8,249,294 B2

(45) Date of Patent: Aug. 21, 2012

(54) DRIVING SYSTEM, ELECTRO-OPTIC DEVICE, AND ELECTRONIC DEVICE

(75) Inventor: Masayuki Koga, Anpachi-cho (JP)

(73) Assignee: Epson Imaging Devices Corporation, Azumino-Shi (JP)

( * ) Notice: Subject to any disclaimer, the term of this patent is extended or adjusted under 35 U.S.C. 154(b) by 975 days.

(21) Appl. No.: 12/254,082

(22) Filed: Oct. 20, 2008

(65) Prior Publication Data

US 2009/0153544 A1 Jun. 18, 2009

(30) Foreign Application Priority Data

Dec. 14, 2007 (JP) ................................ 2007-322916

(51) Int. Cl.
*G06K 9/00* (2006.01)

(52) U.S. Cl. ....................................... 382/100; 349/151

(58) Field of Classification Search .................. 382/100, 382/312, 318, 325; 349/1, 2, 19, 33, 38, 349/39, 41, 49, 143, 149, 151, 152; 345/52, 345/55, 204, 205, 211, 212, 690

See application file for complete search history.

(56) References Cited

U.S. PATENT DOCUMENTS

| | | | | |
|---|---|---|---|---|
| 7,646,370 | B2 * | 1/2010 | Senda et al. | 345/90 |
| 2002/0018035 | A1 * | 2/2002 | Song et al. | 345/87 |
| 2004/0141097 | A1 * | 7/2004 | Takahara et al. | 349/38 |
| 2005/0162448 | A1 * | 7/2005 | Aoki | 345/690 |
| 2005/0219166 | A1 * | 10/2005 | Kim | 345/76 |
| 2005/0253829 | A1 * | 11/2005 | Mamba et al. | 345/204 |
| 2005/0264509 | A1 * | 12/2005 | Senda et al. | 345/90 |
| 2006/0103611 | A1 * | 5/2006 | Choi | 345/82 |
| 2007/0057887 | A1 * | 3/2007 | Itakura et al. | 345/90 |

FOREIGN PATENT DOCUMENTS

| | | |
|---|---|---|
| JP | A-2002-196358 | 7/2002 |
| JP | A-2006-313319 | 11/2006 |
| JP | A-2009-104050 | 5/2009 |

* cited by examiner

*Primary Examiner* — Jason M Repko
*Assistant Examiner* — Shervin Nakhjavan
(74) *Attorney, Agent, or Firm* — Oliff & Berridge, PLC

(57) ABSTRACT

A driving system that drives an electro-optic device including a plurality of pixel electrodes, a counter electrode, a plurality of storage capacitor elements, and an electro-optic material is provided. The driving system includes a supply circuit that selectively supplies voltage to first and second ends of capacitor elements corresponding to a first horizontal line. A switching circuit is also provided that switches, in sequence every predetermined period, each of the voltages to be supplied to the second end of the capacitor elements from a first voltage to a second voltage or from the second voltage to the first voltage. A control circuit electrically connects the second end of the first storage capacitor elements and to each other before the voltage switched by the switching circuit is supplied to the second end of at least one of the storage capacitor elements.

7 Claims, 10 Drawing Sheets

DRIVING SYSTEM, ELECTRO-OPTIC DEVICE, AND ELECTRONIC DEVICE

BACKGROUND

1. Technical Field

The present invention relates to the technical field of a driving system for driving an electro-optic device, such as a liquid crystal device, an electro-optic device equipped with such a driving system, and an electronic device equipped with such an electro-optic device.

2. Related Art

An example of electro-optic devices of this type is a liquid crystal device in which liquid crystal, which is an example of electro-optic materials, is sandwiched between a pair of a device substrate and a counter substrate. A plurality of pixels are arrayed in a pixel area on the device substrate in such a manner that a plurality of pixel sections each including a pixel electrode are arrayed flat in a matrix form so as to correspond to the intersections of scanning lines and data lines. Each of the pixel sections has, as a pixel switching element, for example, a thin-film transistor (hereinafter referred to as a TFT). When the electro-optic device is driven, scanning signals are supplied to the pixel sections through the scanning lines, so that the pixel switching elements are turned on. Then image signals are supplied to the pixel electrodes through the data lines via the pixel switching elements. Typically, a common electrode (or a counter electrode) corresponding to the plurality of pixel electrodes is formed in a solid manner over the plurality of pixel sections across the whole pixel area. When the liquid crystal device is driven, a voltage based on the potential difference between the pixel electrodes and the common electrode is applied to the liquid crystal. Thus, the orientation and order of the liquid crystal are controlled to allow image display.

Low power consumption is earnestly required for liquid crystal devices because of the characteristics, features, and purposes of an electronic device applied. On the other hand, data lines are driven at a high frequency, and a voltage amplitude as high as 10 volts or more is generally necessary to drive liquid crystal, so that data lines are generally supplied with image signals having a high voltage amplitude.

To meet such a request for low power consumption, JP-A-2002-196358 discloses a liquid crystal device that achieves low power consumption by shifting the potential of one end of a storage capacitor element (for example, a capacitor) connected in parallel to liquid crystal to a high level or a low level depending on whether the potential of an image signal supplied to the data line is for positive-polarity writing or negative-polarity writing to thereby decrease the voltage amplitude of the image signal supplied to the data line. JP-A-2006-313319 discloses a liquid crystal device that achieves further low power consumption by, in addition to the structure disclosed in JP-A-2002-196358, bringing the potential of a data line to a voltage corresponding to the same writing polarity among one group of scanning lines to thereby decrease the frequency of the inversion signal of the data line.

However, there is a still further request for lower power consumption.

SUMMARY

An advantage of some aspects of the invention is to provide a driving system that achieves further reduction of power consumption, an electro-optic device equipped with such a driving system, and an electronic device equipped with such an electro-optic device.

Driving System

According to a first aspect of the invention, there is provided a driving system that drives an electro-optic device including a plurality of pixel electrodes, a counter electrode, a plurality of storage capacitor elements whose first ends are each electrically connected to a corresponding pixel electrode of the plurality of pixel electrodes, and an electro-optic material driven in accordance with an electric field applied between the plurality of pixel electrodes and the counter electrode. The driving system includes a supply circuit that supplies one of a first voltage and a second voltage different from the first voltage to a second end of one or a plurality of first storage capacitor elements of the plurality of storage capacitor elements corresponding to a first horizontal line and supplies the other of the first voltage and the second voltage to a second end of one or a plurality of second storage capacitor elements of the plurality of storage capacitor elements corresponding to a second horizontal line subsequent to the first horizontal line; a switching circuit that switches, in sequence every predetermined period, each of the voltages to be supplied to the second end of the first storage capacitor element and the second end of the second storage capacitor element from the first voltage to the second voltage or from the second voltage to the first voltage; and a control circuit that electrically connects the second end of the first storage capacitor element and the second end of the second storage capacitor element to each other before the voltage switched by the switching circuit is supplied to the second end of at least one of the first storage capacitor element and the second storage capacitor element.

Since the driving system according to the first aspect of the invention can drive an electro-optic device, such as a liquid crystal device, by applying voltage to pixel electrodes, a counter electrode, and storage capacitor elements of the electro-optic device. An electro-optic device to be driven by this driving system includes a plurality of pixel electrodes corresponding to the intersections of the data lines to which image signals are supplied and one or a plurality of counter electrodes corresponding to the pixel electrodes. The electro-optic device further includes a plurality of storage capacitor elements whose first end are each electrically connected to a corresponding pixel electrode. Voltages caused by the potential difference between the pixel electrodes and the one or plurality of counter electrodes are applied to the electro-optical material and held in the storage capacitor elements to allow image display.

To drive such an electro-optic device (in particular, to apply voltages to the storage capacitor elements), the driving system according to the first aspect of the invention includes a supply circuit and a switching circuit.

The supply circuit supplies a voltage to a second end of each of the storage capacitor elements of the electro-optic device (that is, the opposite end of the first end connected electrically to the pixel electrode). This supply circuit supplies one of the first voltage (for example, a higher-level voltage) and the second voltage (for example, a lower-level voltage) to the second end of the first storage capacitor element corresponding to the first horizontal line of the storage capacitor elements. This supply circuit supplies the other one of the first voltage and the second voltage to the second end of the second storage capacitor element at the stage subsequent to the first horizontal line. Here "first storage capacitor element" includes one or a plurality of storage capacitor elements belonging to a first group, typically, storage capacitor elements in odd rows or part thereof. "Second storage capacitor element" includes a storage capacitor element corresponding to the second horizontal line subsequent to the first horizontal line corresponding to the first storage capacitor element (in other words, one or a plurality of storage capacitor elements belonging to a second group different from the first group), typically, storage capacitor elements in even rows or part thereof. Here, "subsequent stage" indicates a subsequent row in the scanning direction (in particular, a vertical scanning direction) of the electro-optic device (that is, subsequent scanning). That is, after horizontal scanning of a row corresponding to the first storage capacitor element is performed, horizontal scanning of a row corresponding to the second storage capacitor element is performed. Accordingly, horizontal lines corresponding to the first storage capacitor elements and horizontal lines corresponding to the second storage capacitor elements are arranged alternately. Accordingly, this supply circuit supplies the first voltage and the second voltage to the respective second ends of the storage capacitor elements such that the potential levels of the voltages supplied to the second ends of the storage capacitor elements corresponding to two adjacent horizontal lines are different (inverted). In other words, the first voltage and the second voltage are opposite in polarity with respect to a reference voltage set in the middle of the first voltage and the second voltage, so that voltages inverted in polarity every horizontal line are applied to the storage capacitor elements.

The switching circuit switches, every predetermined period, the voltage to be supplied to the second end of the first storage capacitor element from the first voltage to the second voltage or from the second voltage to the first voltage every predetermined period. Here "predetermined period" indicates a period predetermined to its driving method to invert image signals applied; for example, one vertical scanning period, one horizontal scanning period, one frame period, and one field period. Specifically, when the first voltage is applied to the second end of the first storage capacitor element, the switching circuit switches the voltage to be applied to the second end of the first storage capacitor element from the first voltage to the second voltage. Likewise, for example, when the second voltage is applied to the second end of the first storage capacitor element, the switching circuit switches the voltage to be applied to the second end of the first storage capacitor element from the second voltage to the first voltage. Similarly, the switching circuit switches the voltage to be applied to the second end of the second storage capacitor element from the first voltage to the second voltage or from the second voltage to the first voltage. Therefore, after the switching, the potential of the voltage applied to the respective second ends of the first storage capacitor element and the second storage capacitor element corresponding to two adjacent horizontal lines are maintained at different levels. This switching operation is performed in sequence for each of the storage capacitor elements. For example, the switching operation may be performed on storage capacitor elements corresponding to one horizontal line every one horizontal scanning period. In other words, after a switching operation on storage capacitor elements corresponding to one horizontal line is performed, a switching operation on storage capacitor elements corresponding to the next horizontal line may be perform in the next horizontal scanning period. Alternatively, a switching operation on storage capacitor elements corresponding to two adjacent horizontal lines (that is, the first storage capacitor elements and the second storage capacitor elements) may be performed every two horizontal scanning periods. That is, after a switching operation on storage capacitor elements corresponding to two adjacent horizontal lines is performed in consecutive two horizontal scanning periods, a switching operation on the storage capacitor elements corresponding to the next two adjacent horizontal lines may be performed in the next two consecutive horizontal scanning periods. However, while the switching operation on storage capacitor elements corresponding to one horizontal line is typically performed every one vertical scanning period (or every one frame period), the switching operation may of course be performed at a different cycle.

As will be described in detail later, this switching circuit switches the voltage to be applied to the second end of the first storage capacitor element and the second end of the second storage capacitor element from the first voltage to the second voltage or from the second voltage to the first voltage every predetermined period so as to shift the potentials of the second end of the first storage capacitor element and the second end of the second storage capacitor element to a high level (for example, the first voltage) or a low level (for example, the second voltage) according to the polarity of the voltages of image signals supplied to the data lines.

This driving system includes the control circuit to further reduce power consumption necessary for driving an electro-optic device. The control circuit electrically connects the second end of the first storage capacitor element and the second end of the second storage capacitor element to each other before the voltage switched by the switching circuit is applied to the second end of at least one of the first storage capacitor element and the second storage capacitor element (or before the voltage applied to the second end of at least one of the first storage capacitor element and the second storage capacitor element is switched). Typically, the control circuit short-circuits the second end of the first storage capacitor element and the second end of the second storage capacitor element directly or indirectly via a specified element. In this case, it is preferable that the control circuit be configured to disconnect the second end of the first storage capacitor element and the second end of the second storage capacitor element from the supply circuit.

Since the potential levels of the voltages supplied to the second end of the first storage capacitor element and the second end of the second storage capacitor element are different, the potentials of the second end of the first storage capacitor element and the second end of the second storage capacitor element becomes the middle between the potential of the first voltage and the potential of the second voltage after the second end of the first storage capacitor element and the second end of the second storage capacitor element are short-circuited. In other words, the potentials of the second end of the first storage capacitor element and the second end of the second storage capacitor element can be shifted from the potential of the first voltage or the potential of the second voltage to the intermediate potential without supplying (or consuming) specified power. Then a switching operation by the switching circuit is performed, so that the potentials of the second end of the first storage capacitor element and the second end of the second storage capacitor element becomes the potential of the first voltage or the potential of the second voltage.

In this way, the driving system according to the first aspect of the invention shifts the potentials of the second end of the first storage capacitor element and the second end of the second storage capacitor element to a high level (for example, the first voltage) or a low level (for example, the second voltage) according to the polarities of the voltages of image signals supplied to the data lines. Thus, the potential of the first end of the storage capacitor element is increased or decreased, and the electric charge increased or decreased is distributed to the electro-optical material. As a result, the electro-optical material is provided with an effective voltage higher than the voltages of the image signals supplied to the data lines. In other words, the amplitudes of the voltages of the image signals supplied to the data lines can be smaller than that applied to the electro-optical material via the pixel electrodes. This reduces the power consumption.

In addition, to invert the potentials of the second end of the first storage capacitor element and the second end of the second storage capacitor element, it is enough for the supply circuit to consume lower power that applies the difference between the intermediate potential and the potential of the first voltage or the difference between the intermediate potential and the second voltage. In other words, there is no need for the supply circuit to consume higher power that applies the difference between the potential of the first voltage and the potential of the second voltage or the difference between the potential of the second voltage and the potential of the first voltage. Accordingly, this further reduces power consumption necessary for driving an electro-optic device (in particular, for writing potentials to storage capacitor elements) as compared with a structure in which the difference between the potential of the first voltage and the potential of the second voltage or the difference between the potential of the second voltage and the potential of the first voltage must be applied (that is, a structure in which the second end of the first storage capacitor element and the second end of the second storage capacitor element are not electrically connected before a switching operation).

The driving system according to the first aspect of the invention electrically disconnects the second end of the first storage capacitor element from the second end of the second storage capacitor element after a lapse of a predetermined time since the voltage applied to the second end of the first storage capacitor element is switched from the first voltage to the second voltage or from the second voltage to the first voltage.

This allows the potentials of the second end of the first storage capacitor element and the second end of the second storage capacitor element to be brought to the potential of the first voltage or the potential of the second voltage after the potentials of the second end of the first storage capacitor element and the second end of the second storage capacitor element come to the intermediate potential between the potential of the first voltage and the potential of the second voltage, thus offering the above-described advantages.

In addition to electrically disconnecting the second end of the first storage capacitor element and the second end of the second storage capacitor element, it is preferable to electrically connect the second end of the first storage capacitor element and the second end of the second storage capacitor element to the supply circuit.

Here, "predetermined time" is the time necessary for increasing or decreasing the potentials of the second end of the first storage capacitor element and the second end of the second storage capacitor element by the electrical connection between the second end of the first storage capacitor element and the second end of the second storage capacitor element; for example, a period necessary for the potentials of the second end of the first storage capacitor element and the second end of the second storage capacitor element to reach the intermediate potential between the potential of the first voltage and the potential of the second voltage. Other examples of the "predetermined time" include one horizontal scanning period and one horizontal flyback period, to be described later.

Preferably, in the driving system, the electro-optic device includes data lines to which image signals are supplied and scanning lines to which scanning signals are supplied in sequence to control the electrical connection between the data lines and the plurality of pixel electrodes, the scanning signal being supplied to every one or more horizontal lines; and the control circuit electrically connects the second end of the first storage capacitor element and the second end of the second storage capacitor element to each other at the timing responsive to the scanning signal supplied to the scanning line corresponding to a third horizontal line subsequent to the second horizontal line.

In this case, the scanning signal controls the timing to apply an image signal to a pixel electrode. Therefore, for example, after writing according to the potential of an image signal supplied to a pixel electrode is performed on the electro-optic material and the storage capacitor element, the second end of the first storage capacitor element and the second end of the second storage capacitor element can be electrically connected to each other. Thereafter, as will be described in detail later, the potentials of the second end of the first storage capacitor element and the second end of the second storage capacitor element are shifted to a high level or a low level according to the polarities of the voltages of the image signals applied to the data lines. This prevents the electrical connection between the second end of the first storage capacitor element and the second end of the second storage capacitor element achieved by the control circuit from influencing image display.

In addition, since the second end of the first storage capacitor element and the second end of the second storage capacitor element are electrically connected according to the timing responsive to the scanning signal applied at the subsequent stage, the second end of the first storage capacitor element and the second end of the second storage capacitor element can be electrically connected to each other after writing according to the potential of an image signal supplied to a pixel electrode is performed on the electro-optic material and the storage capacitor element, irrespective of whether the scanning direction is forward or backward.

In the driving system that electrically connects the second end of the first storage capacitor element and the second end of the second storage capacitor element to each other at the timing responsive to the scanning signal, the control circuit may electrically connect the second end of the first storage capacitor element and the second end of the second storage capacitor element to each other while the scanning signal supplied to the scanning line corresponding to the third horizontal line is at a selected-state level.

This configuration allows the second end of the first storage capacitor element and the second end of the second storage capacitor element to be electrically connected at proper timing according to a scanning signal applied, thus providing the above various advantages.

Here, "selected-state level" indicates a level at which a switching element, such as a TFT, which is electrically connected to a scanning line and whose state is switched according to the level of the scanning signal is turned on (in other words, a pixel section including the switching element is brought into a selected state).

In the driving system that electrically connects the second end of the first storage capacitor element and the second end of the second storage capacitor element to each other at the timing responsive to the scanning signal, the control circuit may electrically disconnect the second end of the first storage capacitor element from the second end of the second storage capacitor element while the scanning signal supplied to the scanning line corresponding to the third horizontal line is at a non-selected-state level.

This configuration allows the second end of the first storage capacitor element to be electrically disconnected from the second end of the second storage capacitor element at proper timing according to a scanning signal applied, thus providing the above various advantages.

Here, "non-selected-state level" indicates a level at which a switching element, such as a TFT, which is electrically connected to a scanning line and whose state is switched according to the level of the scanning signal is turned off (in other words, a pixel section including the switching element is brought into a non-selected state).

In the driving system that electrically connects the second end of the first storage capacitor element and the second end of the second storage capacitor element to each other at the timing responsive to the scanning signal, the switching circuit may be configured to switch each of the voltages supplied to the second end of the first storage capacitor element and the second end of the second storage capacitor element from the first voltage to the second voltage or from the second voltage to the first voltage so that, in the case where the scanning signal in the selected-state level is supplied to the scanning line corresponding to the first horizontal line, (i) when the potential of the data line corresponds to positive-polarity writing, the switching circuit shifts the potential of the second end of the first storage capacitor element to a high level and shifts the potential of the second end of the second storage capacitor element to a low level after the scanning signal supplied to the scanning line corresponding to the third horizontal line shifts to the non-selected-state level; and (ii) when the potential of the data line corresponds to negative-polarity writing, the switching circuit shifts the potential of the second end of the first storage capacitor element to a low level and shifts the potential of the second end of the second storage capacitor element to a high level after the scanning signal supplied to the scanning line corresponding to the third horizontal line shifts to the non-selected-state level.

This configuration allows the potentials of the second end of the first storage capacitor element and the second end of the second storage capacitor element to be shifted to a high level or a low level after writing according to the potential of an image signal supplied to a pixel electrode is performed on the electro-optic material and the storage capacitor element and the second end of the first storage capacitor element and the second end of the second storage capacitor element are electrically connected. That is, the potentials of the second end of the first storage capacitor element and the second end of the second storage capacitor element can be shifted to a high level or a low level at proper timing.

Preferably, in the driving system, the switching circuit is provided one for each set of storage capacitor elements corresponding to adjacent two horizontal lines; and the switching circuit corresponding to the first storage capacitor element and the second storage capacitor element switches each of the voltages supplied from the supply circuit to the second end of the first storage capacitor element and the second end of the second storage capacitor element from the first voltage to the second voltage or from the second voltage to the first voltage at the timing responsive to the scanning signal supplied to the scanning line corresponding to the third horizontal line subsequent to the second horizontal line of the plurality of storage capacitor elements.

This configuration needs only one switching circuit every two horizontal lines, thus reducing power consumption necessary for the operation of the switching circuit as compared with a configuration having one switching circuit every one horizontal line. Moreover, this configuration reduces physical space for disposing the switching circuit, narrowing the frame.

Electro-Optic Device

An electro-optic device according to a second aspect of the invention includes the driving system according to the first aspect of the invention (including various forms).

Since the electro-optic device according to the second aspect of the invention includes the driving system according to the first aspect of the invention (or various forms), it has the same advantages as the driving system. In other words, various electro-optic devices having the same advantages as the driving system can be provided, such as liquid crystal devices.

Electronic Device

An electronic device according to a third aspect of the invention includes the electro-optic device according to the second aspect of the invention (including various forms).

Since the electronic device according to the third aspect of the invention includes the electro-optic device according to the second aspect of the invention (or various forms), it has the same advantages as the electro-optic device. In other words, various electronic devices having the same advantages as the electro-optic device can be provided, such as projection display devices, TVs, portable phones, electronic notepads, portable audio players, word processors, digital cameras, view-finder or monitor-direct-view videotape recorders, work stations, videophones, POS terminals, and touch panels.

BRIEF DESCRIPTION OF THE DRAWINGS

The invention will be described with reference to the accompanying drawings, wherein like numbers reference like elements.

DESCRIPTION OF EXEMPLARY EMBODIMENTS

The operation and other advantages of the invention will become more apparent from the following description.

A preferred embodiment of the invention will be described with reference to the drawings. This embodiment is described when applied to a liquid crystal device as an example of an electro-optic device according to the invention.

(1) Basic Structure of Liquid Crystal Device

Figure 1:
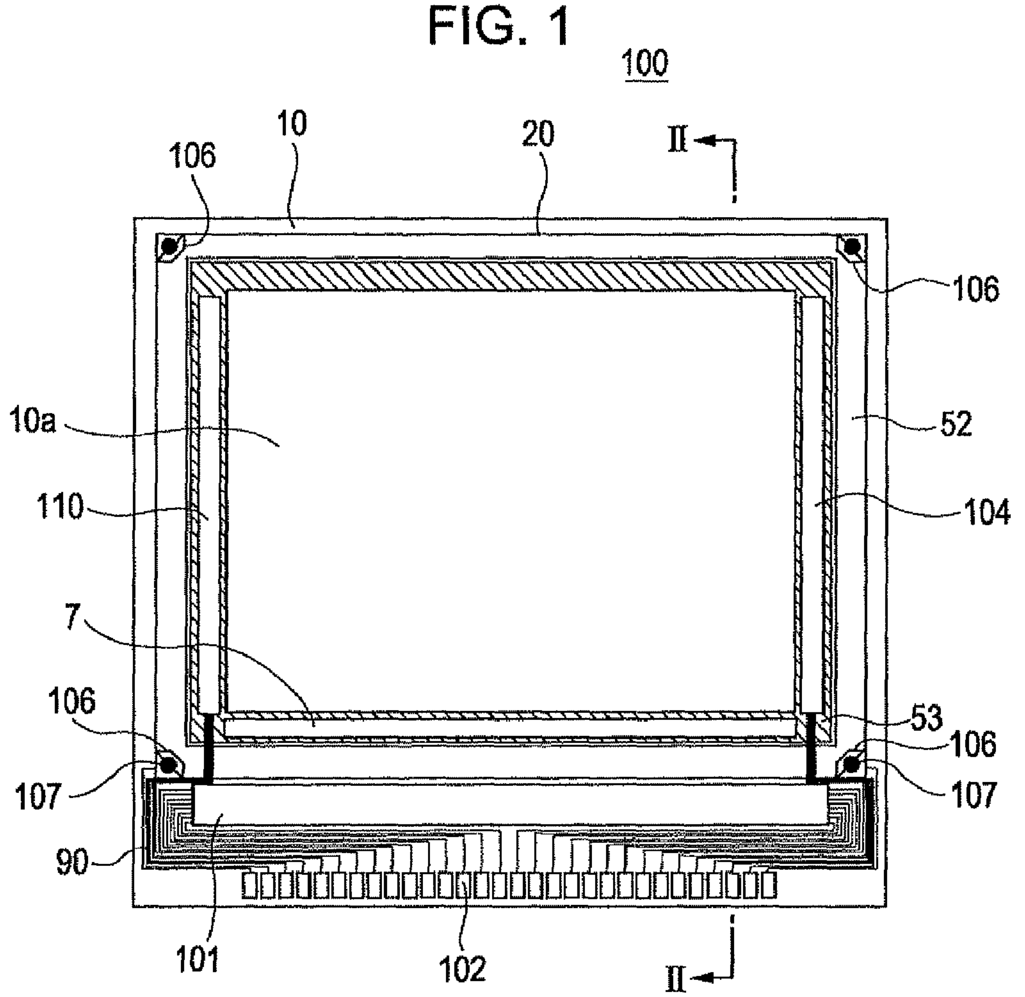
FIG. 1 is a plan view showing the structure of a liquid crystal device according to an embodiment of the invention.
Figure 2:
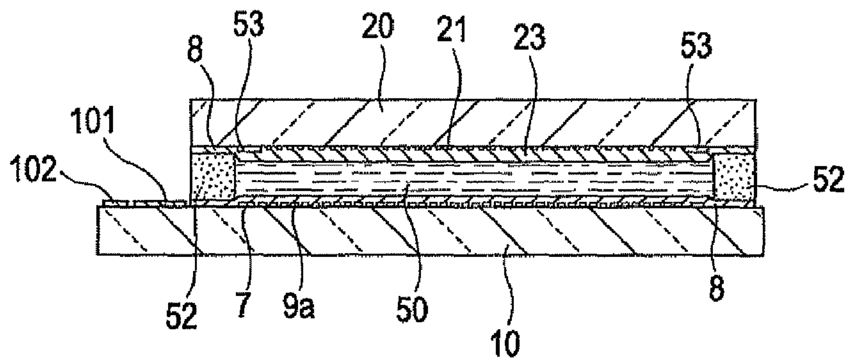
FIG. 2 is a sectional view taken along line II-II of FIG. 1.

First, the structure of a liquid crystal device 100 according to this embodiment will be described with reference to FIGS. 1 and 2. FIG. 1 is a plan view showing the structure of the liquid crystal device 100 according to this embodiment. FIG. 2 is a sectional view taken along line II-II of FIG. 1.

Referring to FIGS. 1 and 2, the liquid crystal device 100 according to this embodiment has a TFT-array substrate 10 and a counter substrate 20, an example of "a pair of substrates" of the invention, on opposite sides. Between the TFT-array substrate 10 and the counter substrate 20 is sealed a liquid crystal layer 50. The TFT-array substrate 10 and the counter substrate 20 are bonded together using a sealing material 52 provided on a frame sealing area around an image display area 10*a*.

Referring to FIG. 1, a frame light-shielding film 53 that defines the frame area of the image display area 10*a* is provided on the counter substrate 20 inside and in parallel with the sealing area in which the sealing material 52 is disposed. Of the peripheral area, the area outside the sealing area having the sealing material 52 has a data-line driving circuit 101 and external-circuit connecting terminals 102 along one side of the TFT-array substrate 10. Alternatively, the data-line driving circuit 101 may be disposed inside the sealing area so as to be covered with the frame light-shielding film 53. A sampling circuit 7 is disposed inside the sealing area extending along the one side so as to be covered with the frame light-shielding film 53. A scanning-line driving circuit 104 and a capacity-line driving circuit 110, which is one concrete example of "a driving system" of the invention, are disposed inside the sealing area along the two sides adjacent to the one side so as to be covered with the frame light-shielding film 53. The TFT-array substrate 10 has vertically conducting terminals 106 for connecting the substrates using vertically conductive materials 107 at the positions opposite the four corners of the counter substrate 20. This allows electrical conduction between the TFT-array substrate 10 and the counter substrate 20.

The TFT-array substrate 10 has thereon a routed wire 90 for electrically connecting the external-circuit connecting terminals 102, the data-line driving circuit 101, the scanning-line driving circuit 104, and the vertically conducting terminals 106.

Referring to FIG. 2, the TFT-array substrate 10 has thereon a layered structure in which thin-film transistors (TFTs) for switching pixels, serving as driver elements, and wires, such as scanning lines and data lines, are formed. The image display area 10*a* has pixel electrodes 9*a* in a matrix form on the pixel switching TFTs and the wires, such as scanning lines and data lines. An alignment film 8 is provided on the pixel electrodes 9*a*. On the other hand, the surface of the counter substrate 20 opposite the TFT-array substrate 10 has a light-shielding film 23. The light-shielding film 23 is formed of, for example, a light-shielding metal film, which has a grid pattern in the image display area 10*a* on the counter substrate 20. A counter electrode 21 made of a transparent material, such as ITO, is formed in a solid form on the light-shielding film 23 so as to be opposite the pixel electrodes 9*a*. The counter electrode 21 has thereon another alignment film 8. The liquid crystal layer 50 is formed of liquid crystal which is one kind or a mixture of several kinds of nematic liquid crystal, which is aligned in a predetermined orientation between the pair of alignment films 8. The above-described structure is of a so-called vertical electric field mode in which the liquid crystal layer 50 is driven by the electric field between the pixel electrodes 9*a* of the TFT-array substrate 10 and the counter electrode 21 of the counter substrate 20. Alternatively, it may be of a transverse electric field mode, such as in-plane switching (IPS) or fringe-field switching (FFS). In the transverse electric field mode, pixel electrodes and a counter electrode are disposed on the TFT-array substrate, so that no electrode is disposed on the counter substrate. This eliminates the need for the vertically conducting terminals for connecting the TFT-array substrate and the counter substrate.

Although not shown, the TFT-array substrate 10 may have thereon, in addition to the data-line driving circuit 101 and the scanning-line driving circuit 104, an inspection circuit or an inspecting pattern for inspecting the quality of the liquid crystal device 100 for defects during manufacture and at shipment.

(2) Detailed Structure of Liquid Crystal Device

Figure 3:
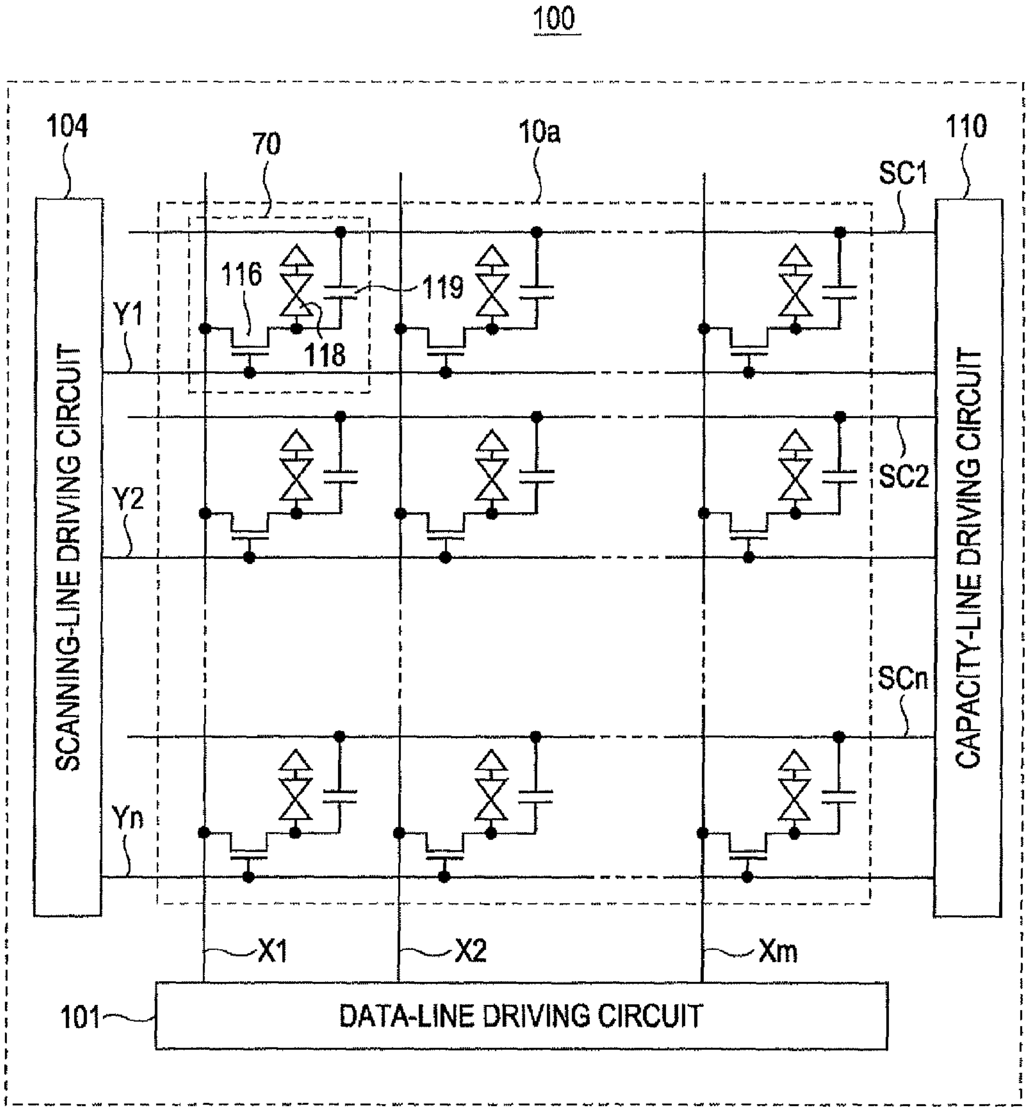
FIG. 3 is a conceptual block diagram of the electrical structure of the essential parts of the liquid crystal device of this embodiment.

Referring to FIG. 3, the electrical structure of the essential parts of the liquid crystal device 100 according to this embodiment will be described. FIG. 3 is a conceptual block diagram of the electrical structure of the essential parts of the liquid crystal device 100 of this embodiment.

Referring to FIG. 3, the liquid crystal device 100 of this embodiment has driving circuits, such as the scanning-line driving circuit 104, the data-line driving circuit 101, and the capacity-line driving circuit 110, around the image display area 10*a* on the TFT-array substrate 10.

The scanning-line driving circuit 104 supplies scanning signals to scanning lines Y1 to Yn (n is an integer greater than or equal to 1) in sequence. For example, when a high-level scanning signal is supplied to a scanning line Ya (a is an integer that satisfies $1 \leqq a \leqq n$), all TFTs 116 connected to the scanning line Ya are turned on, so that all pixel sections 70 corresponding to the scanning line Ya are selected.

The data-line driving circuit 101 supplies image signals to data lines X1 to Xm (m is an integer greater than or equal to 1) in sequence to write image voltages corresponding to the image signals to the pixel electrodes 9*a* and the storage capacitors 119 via the TFTs 116 in ON-state. In this embodiment, in particular, the data-line driving circuit 101 supplies image signals to the data lines X1 to Xm with reference to a signal PS, which is inverted in polarity (in other words, logical level) every one horizontal scanning period and, in the same horizontal scanning period, is inverted every one vertical scanning period so as to perform positive-polarity writing when the logical level of the signal PS is high and perform negative-polarity writing when the logical level of the signal PS is low. More specifically, when the data-line driving circuit 101 performs positive-polarity writing on the $a^{th}$-row pixel sections 70 during one horizontal scanning period, the data-line driving circuit 101 performs negative-polarity writing on the $a+1^{th}$-row pixel sections 70 and, in the next vertical scanning period, performs negative-polarity writing on the $a^{th}$-row pixel sections 70. That is, in this embodiment, the data-line driving circuit 101 inverts the polarity from the scanning line Y to the scanning line Yn. The polarity inversion of this embodiment is AC inversion of the potential levels of the image signals supplied to the data lines X1 to Xm with reference to the potential of the counter electrode 21, which is the second end of liquid crystal elements 118.

As will be described in detail below, the capacity-line driving circuit 110 supplies a first voltage VSCH or a second voltage VSCL whose potential is lower than the first voltage VSCH to capacitor lines SC1 to SCn. More specifically, the capacity-line driving circuit 110 supplies the first voltage VSCH and the second voltage VSCL alternately every one vertical scanning period (or every one field period or every one frame period) to the $a^{th}$-row capacitor line SCa. For example, when the capacity-line driving circuit 110 supplies the first voltage VSCH to the capacitor line SCa in one vertical scanning period, the capacity-line driving circuit 110 supplies the second voltage VSCL to the capacitor line SCa in the next vertical scanning period. On the other hand, when the capacity-line driving circuit 110 supplies the second voltage VSCL to the capacitor line SCa in one vertical scanning period, the capacity-line driving circuit 110 supplies the first voltage VSCH to the capacitor line SCa in the next vertical scanning period. At this time, the capacity-line driving circuit 110 supplies the first voltage VSCH and the second voltage VSCL alternately every one vertical scanning period (or every one field period or every one frame period) to the $a^{th}$-row capacitor line SCa according to whether positive-polarity writing or negative-polarity writing is performed. Specifically, when positive-polarity writing is performed on the $a^{th}$-row pixel sections 70, the capacity-line driving circuit 110 supplies the relatively high-level first voltage VSCH to the $a^{th}$-row pixel sections 70 when the scanning signal supplied to the $a+1^{th}$-row scanning line Ya+1 subsequent to the $a^{th}$ row comes to a low level. In contrast, when negative-polarity writing is performed on the $a^{th}$-row pixel sections 70, the capacity-line driving circuit 110 supplies the relatively low-level second voltage VSCL to the $a^{th}$-row pixel sections 70 when the scanning signal supplied to the $a+1^{th}$-row scanning line Ya+1 subsequent to the $a^{th}$ row comes to a low level. The capacity-line driving circuit 110 supplies different voltages to the adjacent capacitor lines SCa−1 and SCa. Specifically, the capacity-line driving circuit 110 supplies the first voltage VSCH (or the second voltage VSCL) to the capacitor line SCa−1 and supplies the second voltage VSCL (or the first voltage VSCH) to the capacitor line SCa adjacent to the capacitor line SCa−1. The configuration and detailed operation of the capacity line driving circuit 110 will be described later in detail (see FIGS. 4 to 7).

The liquid crystal device 100 of this embodiment includes the pixel sections 70 in a matrix form in the image display area 10*a* at the center of the TFT-array substrate 10.

The pixel sections 70 each include the pixel-switching TFT 116, the pixel electrode 9*a*, the liquid crystal element 118, the counter electrode 21, and the storage capacitor 119.

The TFT 116 is configured such that the source terminal is electrically connected to one of the data lines X1 to Xm, the gate terminal is electrically connected to one of the scanning line Y1 to Yn, and the drain terminal is electrically connected to the pixel electrode 9*a*. The pixel-switching TFT 116 is switched between ON and OFF according to the scanning signal supplied from the scanning-line driving circuit 104.

The liquid crystal element 118 is constituted by the pixel electrode 9*a*, the counter electrode 21, and liquid crystal located between the pixel electrode 9*a* and the counter electrode 21. The pixel electrode 9*a* is electrically connected to one of the data line X1 to Xm via the TFT 116. The counter electrode 21 is electrically connected to a common line (not shown). When the liquid crystal device 100 is in operation, an electric field is generated between the pixel electrodes 9*a* having the potentials of image signals supplied through the data lines X1 to Xm via the TFTs 116 and the counter electrode 21 having the potential of a common voltage supplied through the common line. The liquid crystal is driven according to the electric field, that is, changed in the orientation and order of the molecule set, to modulate light, allowing gray-level assignment.

The storage capacitor 119 is added to prevent the leakage of held image signals. One of the electrodes that constitute the storage capacitor 119 is electrically connected to the pixel electrode 9*a* and the other electrode is electrically connected to one of the capacitor lines SC1 to SCn.

(3) Concrete Configuration and Operation of Capacity-Line Driving Circuit

Figure 4:
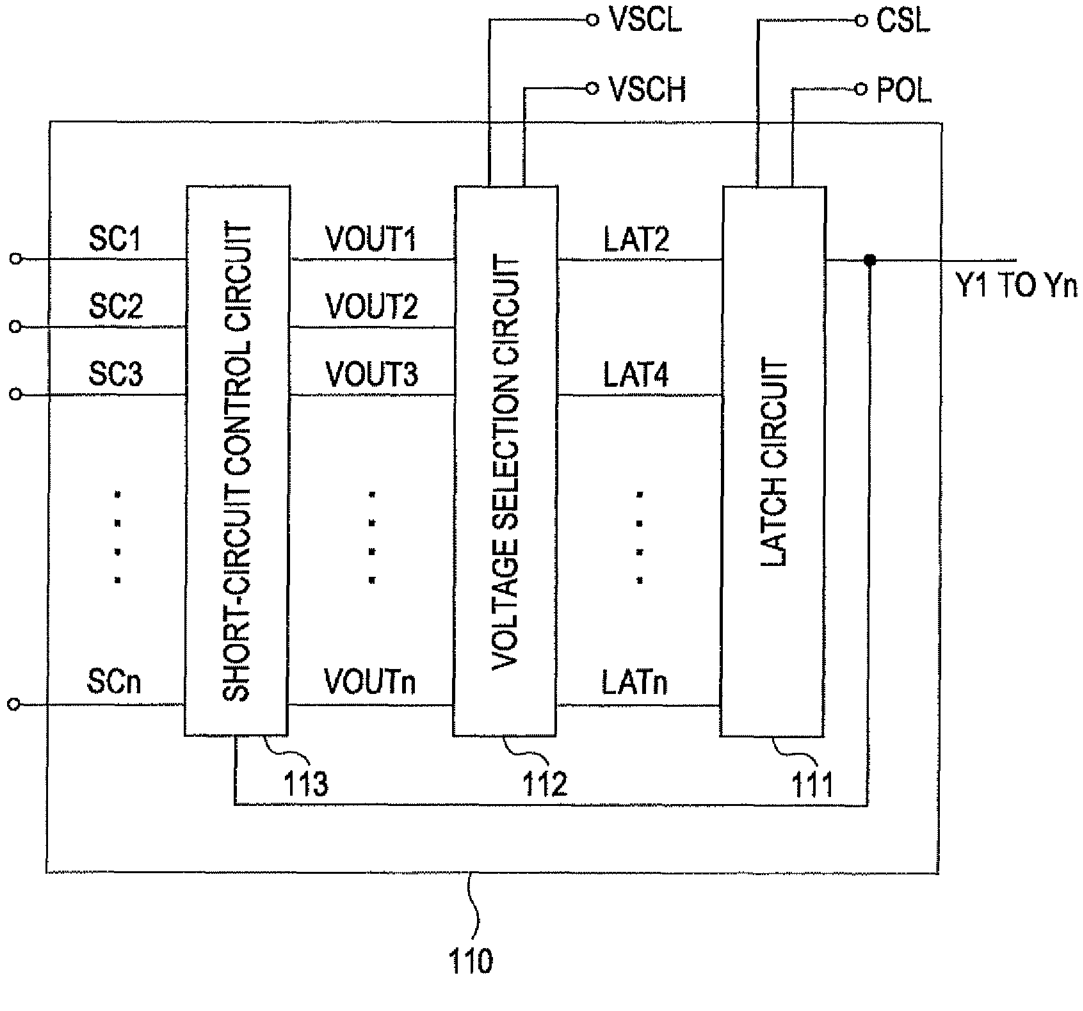
FIG. 4 is a conceptual block diagram showing the configuration of a capacity-line driving circuit.

Referring next to FIG. 4, the concrete configuration and operation of the capacity-line driving circuit 110 will be described. FIG. 4 is a conceptual block diagram showing the configuration of the capacity-line driving circuit 110.

As shown in FIG. 4, the capacity-line driving circuit 110 includes a latch circuit 111 which is one specific example of "a supply circuit" and "a switching circuit" of the invention, a voltage selection circuit 112 which is one specific example of "the supply circuit" and "the switching circuit" of the invention, and a short-circuit control circuit 113 which is one specific example of "a control circuit" of the invention.

Figure 5:
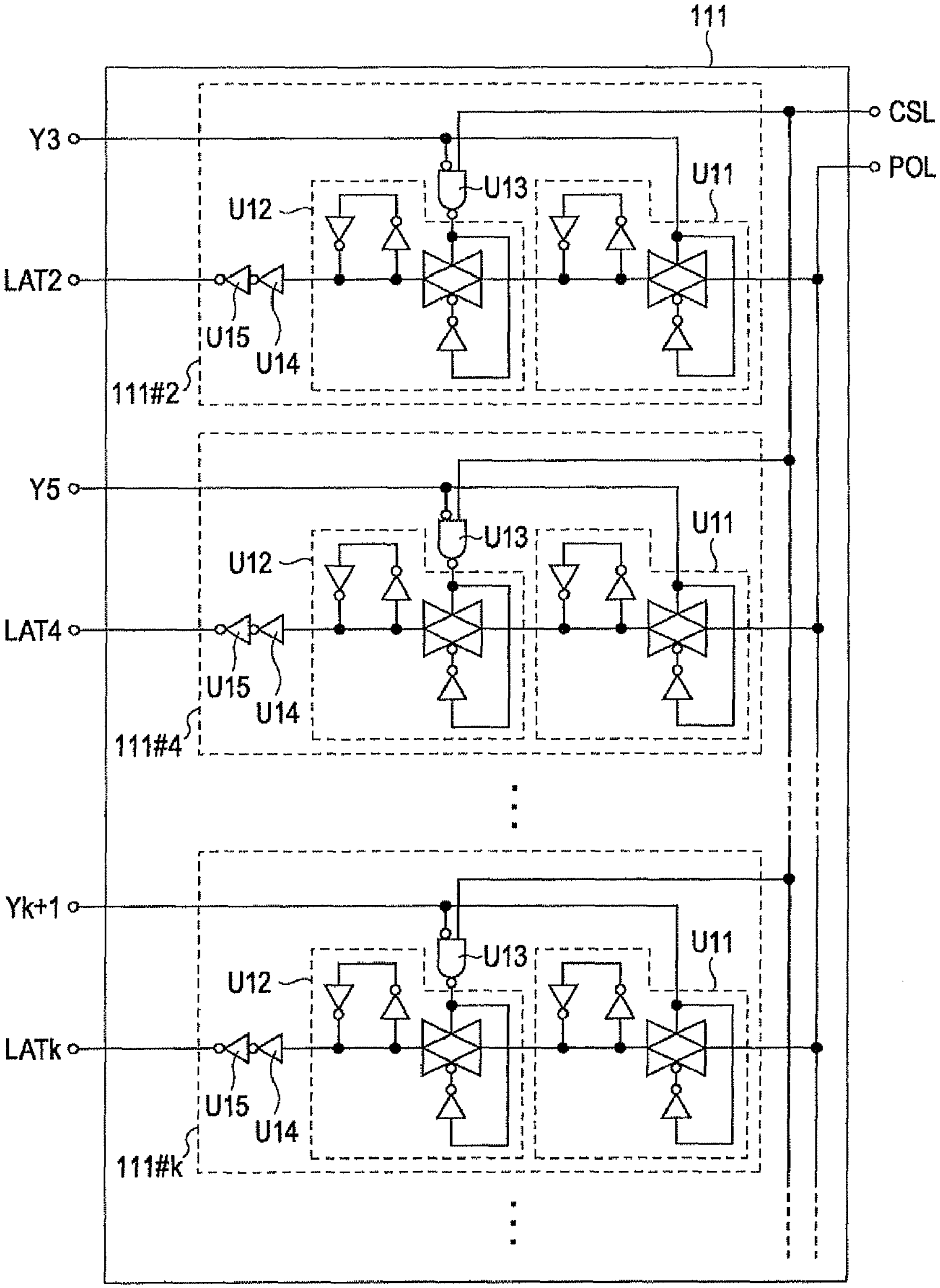
FIG. 5 is a conceptual block diagram showing the configuration of a latch circuit of the capacity-line driving circuit.

Referring next to FIG. 5, the configuration of the latch circuit 111 of the capacity-line driving circuit 110 will be described. FIG. 5 is a conceptual block diagram showing the configuration of the latch circuit 111 of the capacity-line driving circuit 110.

As shown in FIG. 5, the latch circuit 111 includes a latch circuit section 111#*k* corresponding to a $k-1^{th}$-row capacity line SCk−1 and a $k^{th}$-row capacity line SCk, where k is an integer that satisfies $2 \leqq k \leqq n$, typically, an even number.

The latch circuit section 111#*k* includes a latch U11 that holds a polarity signal POL when the logical level of a scanning signal supplied to a scanning line Yk+1 at the subsequent stage (the next row) of the capacity lines SCk−1 and SCk corresponding to the latch circuit section 111#*k* is high, a latch U12 that outputs the polarity signal POL held by the latch U11 as a latch signal LATk at the timing at which a capacity control signal CSL comes to a high level, and a NOR circuit U13 that supplies an inversion signal of the OR of the inverted signal of the capacity control signal CSL and the scanning signal supplied to the scanning line Yk+1 to the latch U12. The output signal from the NOR circuit U13 prevents the latch U12 from outputting the polarity signal POL held by the latch U11 as the latch LATk even if the capacity control signal CSL comes to a high level in the case where the scanning signal supplied to the scanning line Yk+1 is at a high level.

The polarity signal POL switches from a high potential level to a low potential level or from a low potential level to a high potential level every one vertical scanning period. The capacity control signal CSL has one high-level pulse every one horizontal scanning period.

Figure 6:
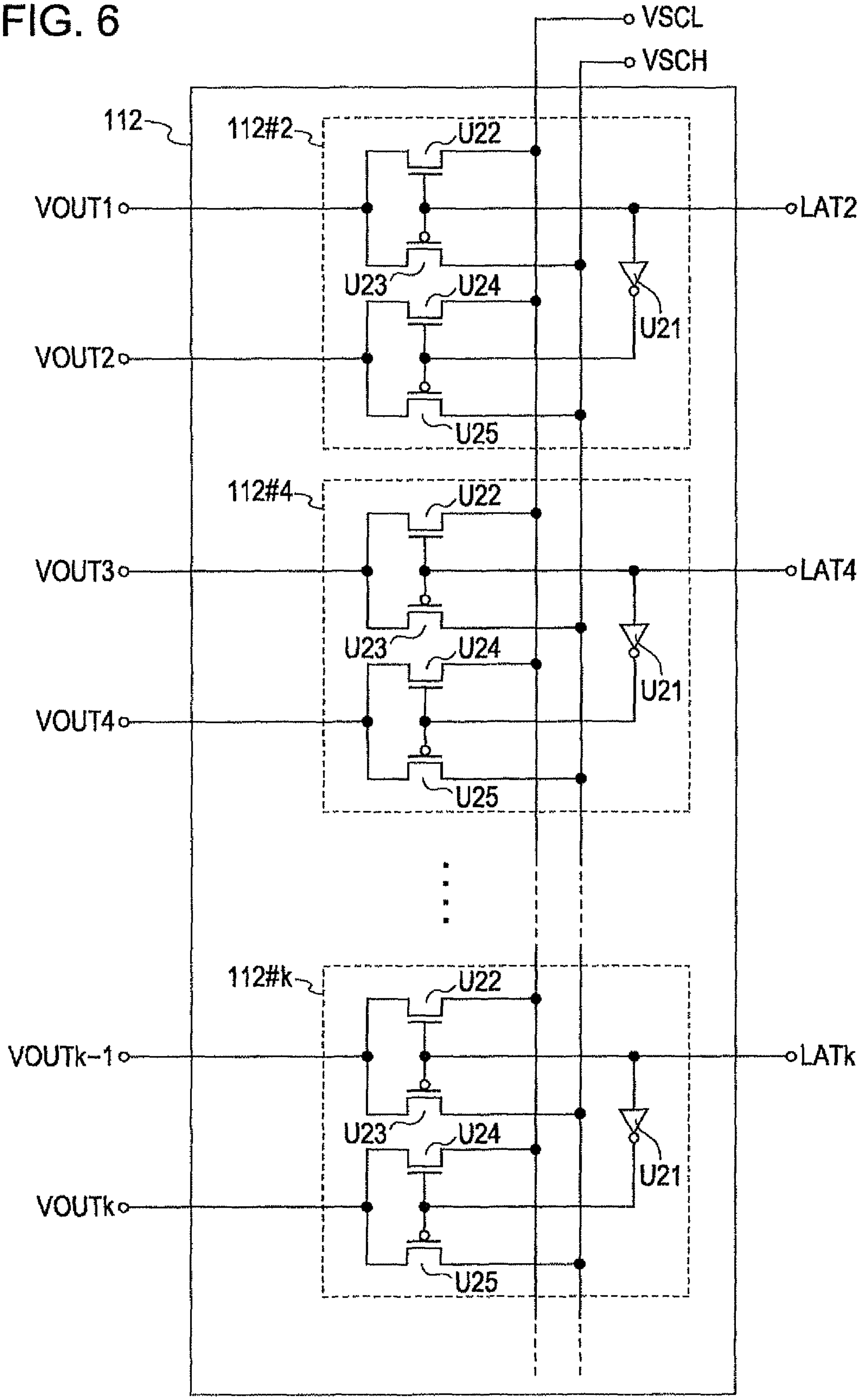
FIG. 6 is a conceptual block diagram showing the configuration of a voltage selection circuit of the capacity-line driving circuit.

Referring next to FIG. 6, the configuration of the voltage selection circuit 112 of the capacity-line driving circuit 110. FIG. 6 is a conceptual block diagram showing the configuration of the voltage selection circuit 112 in the capacity-line driving circuit 110.

A shown in FIG. 6, the voltage selection circuit 112 includes a voltage selection circuit 112#*k* corresponding to the $k-1^{th}$-row capacity line SCk−1 and the $k^{th}$-row capacity line SCk, where k is an integer that satisfies $2 \leqq k \leqq n$, typically, an even number.

The voltage selection circuit 112#*k* includes an inverter U21, a TFT U22, a TFT U23, a TFT U24, and a TFT U25.

The input terminal of the inverter U21, the non-inverting-input gate terminal of the TFT U22, and the non-inverting-input gate terminal of the TFT U23 receive the latch signal LATk output from the latch circuit 111.

The output terminal of the inverter U21 is electrically connected to the non-inverting-input gate terminal of the TFT U24 and the non-inverting-input gate terminal of the TFT U25. The source terminal of the TFT U23 and the source terminal of the TFT U25 are supplied with the first voltage VSCH. The source terminal of the TFT U22 and the source terminal of the TFT U24 are supplied with the second voltage VSCL. The drain terminal of the TFT U22 and the drain terminal of the TFT U23 are electrically connected to each other. The drain terminal of the TFT U24 and the drain terminal of the TFT U25 are electrically connected to each other.

The voltage selection circuit 112#*k* operates as follows:

When the latch signal LATk at a high level is output from the latch circuit 111, the high-level latch signal LATk is input to the non-inverting-input gate terminal of the TFT U22 and the non-inverting-input gate terminal of the TFT U23. In addition, the high-level latch signal LATk is inverted in polarity into a low-level signal by the inverter U21. The low-level signal is input to the non-inverting-input gate terminal of the TFT U24 and the non-inverting-input gate terminal of the TFT U25. Therefore, the TFT U22 is turned on, the TFT U23 is turned off, the TFT U24 is turned off, and the TFT U25 is turned on. As a result, the second voltage VSCL is output as a voltage level signal VOUTk−1 through a VSCL line for the second voltage VSCL via the TFT U22, and the first voltage VSCH is output as a voltage level signal VOUTk through a VSCH line for the first voltage VSCH via the TFT U25.

On the other hand, when the latch signal LATk at a low level is output from the latch circuit 111, the low-level latch signal LATk is input to the non-inverting-input gate terminal of the TFT U22 and the non-inverting-input gate terminal of the TFT U23. In addition, the low-level latch signal LATk is inverted in polarity into a high-level signal by the inverter U21. The high-level signal is input to the non-inverting-input gate terminal of the TFT U24 and the non-inverting-input gate terminal of the TFT U25. Therefore, the TFT U22 is turned off, the TFT U23 is turned on, the TFT U24 is turned on, and the TFT U25 is turned off. As a result, the first voltage VSCH is output as the voltage level signal VOUTk−1 through the VSCH line for the first voltage VSCH via the TFT U23, and the second voltage VSCL is output as the voltage level signal VOUTk through the VSCL line for the second voltage VSCL via the TFT U24.

Figure 7:
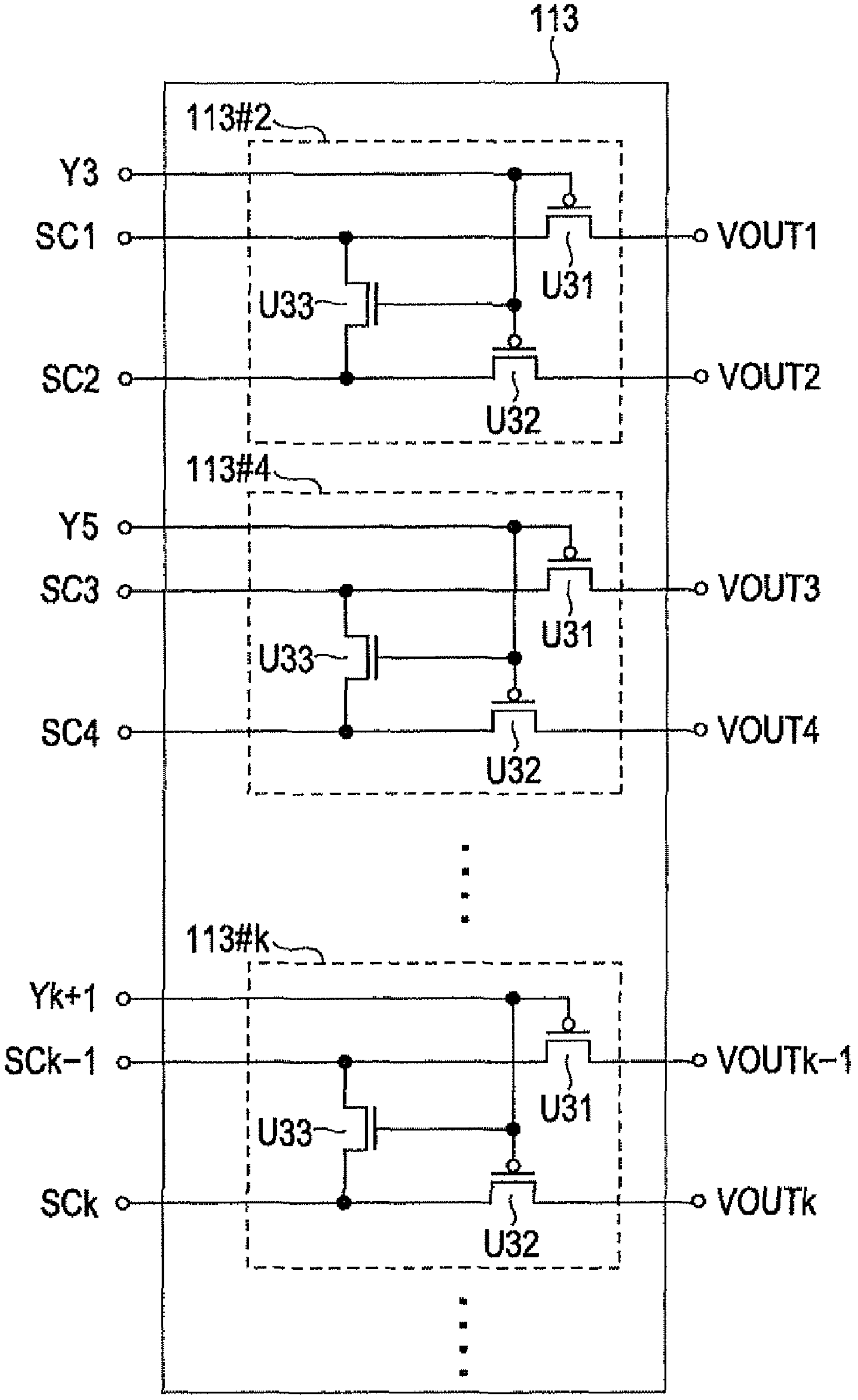
FIG. 7 is a conceptual block diagram showing the configuration of a short-circuit control circuit of the capacity-line driving circuit.

Referring next to FIG. 7, the configuration of the short-circuit control circuit 113 of the capacity-line driving circuit 110 will be described. FIG. 7 is a conceptual block diagram showing the configuration of the short-circuit control circuit 113 in the capacity-line driving circuit 110.

As shown in FIG. 7, the short-circuit control circuit 113 includes a short-circuit control circuit 113#*k* corresponding to the k−1$^{th}$-row capacity line SC−1 and the k$^{th}$-row capacity line SCk, where k is an integer that satisfies 2≦k≦n, typically, an even number.

The short-circuit control circuit 113 includes a TFT U31, a TFT U32, and a TFT U33.

The source terminal of the TFT U31 receives input of the voltage level signal VOUTk−1. The non-inverting-input gate terminal of the TFT U31 is electrically connected to the scanning line Yk+1 at the subsequent stage (the next row) of the capacity lines SCk−1 and SCk corresponding to the short-circuit control circuit 113#*k*. The drain terminal of the TFT U31 is electrically connected to the source terminal of the TFT U33 and the capacity line SCk−1.

The source terminal of the TFT U32 receives input of the voltage level signal VOUTk. The non-inverting-input gate terminal of the TFT U32 is electrically connected to the scanning line Yk+1 at the subsequent stage (the next row) of the capacity lines SCk−1 and SCk corresponding to the short-circuit control circuit 113#*k*. The drain terminal of the TFT U32 is electrically connected to the drain terminal of the TFT U33 and the capacity line SCk.

The non-inverting-input gate terminal of the TFT U33 is electrically connected to the scanning line Yk+1 at the subsequent stage (the next row) of the capacity lines SCk−1 and SCk corresponding to the short-circuit control circuit 113#*k*.

The short-circuit control circuit 113#*k* operates as follows:

When a high-level scanning signal is supplied to the scanning line Yk+1, the high-level scanning signal is input to the non-inverting-input gate terminal of the TFT U31, the non-inverting-input gate terminal of the TFT U32, and the non-inverting-input gate terminal of the TFT U33. Therefore, the TFTs U31 and U32 are turned off and the TFT U33 is turned on. As a result, the capacity line SCk−1 is not supplied with the voltage level signal VOUTk−1 and the capacity line SCk is not supplied with the voltage level signal VOUTk. The capacity lines SCk−1 and SCk are electrically connected (or short-circuited) via the TFT U33. Accordingly, the potentials of the capacity line SCk−1 to which one of the first voltage VSCH and the second voltage VSCL is supplied and the capacity line SCk to which the other of the first voltage VSCH and the second voltage VSCL is supplied become equal. Typically, the potentials of the capacity lines SCk−1 and SCk each come to the middle of those of the first voltage VSCH and the second voltage VSCL (typically, the mean value of the potentials of the first voltage VSCH and the second voltage VSCL).

In contrast, when a low-level scanning signal is supplied to the scanning line Yk+1, the low-level scanning signal is input to the non-inverting-input gate terminal of the TFT U31, the non-inverting-input gate terminal of the TFT U32, and the non-inverting-input gate terminal of the TFT U33. Therefore, the TFTs U31 and U32 are turned on and the TFT U33 is turned off. As a result, the capacity line SCk−1 is supplied with the voltage level signal VOUTk−1 and the capacity line SCk is supplied with the voltage level signal VOUTk. The capacity lines SCk−1 and SCk are electrically disconnected via the TFT U33. Accordingly, the capacity lines SCk−1 and SCk, which have an intermediate potential, are supplied with the first voltage VSCH or the second voltage VSCL, depending on whether the pixel sections 70 in the corresponding row was subjected to positive-polarity writing or negative-polarity writing. As a result, the capacity lines SCk−1 and SCk each have the potential of the first voltage VSCH or the potential of the second voltage VSCL. In other words, the potential of the capacity line SC can be shifted from the potential of the first voltage VSCH or the potential of the second voltage VSCL to the intermediate potential without supplying (or consuming) specified power.

Figure 8:
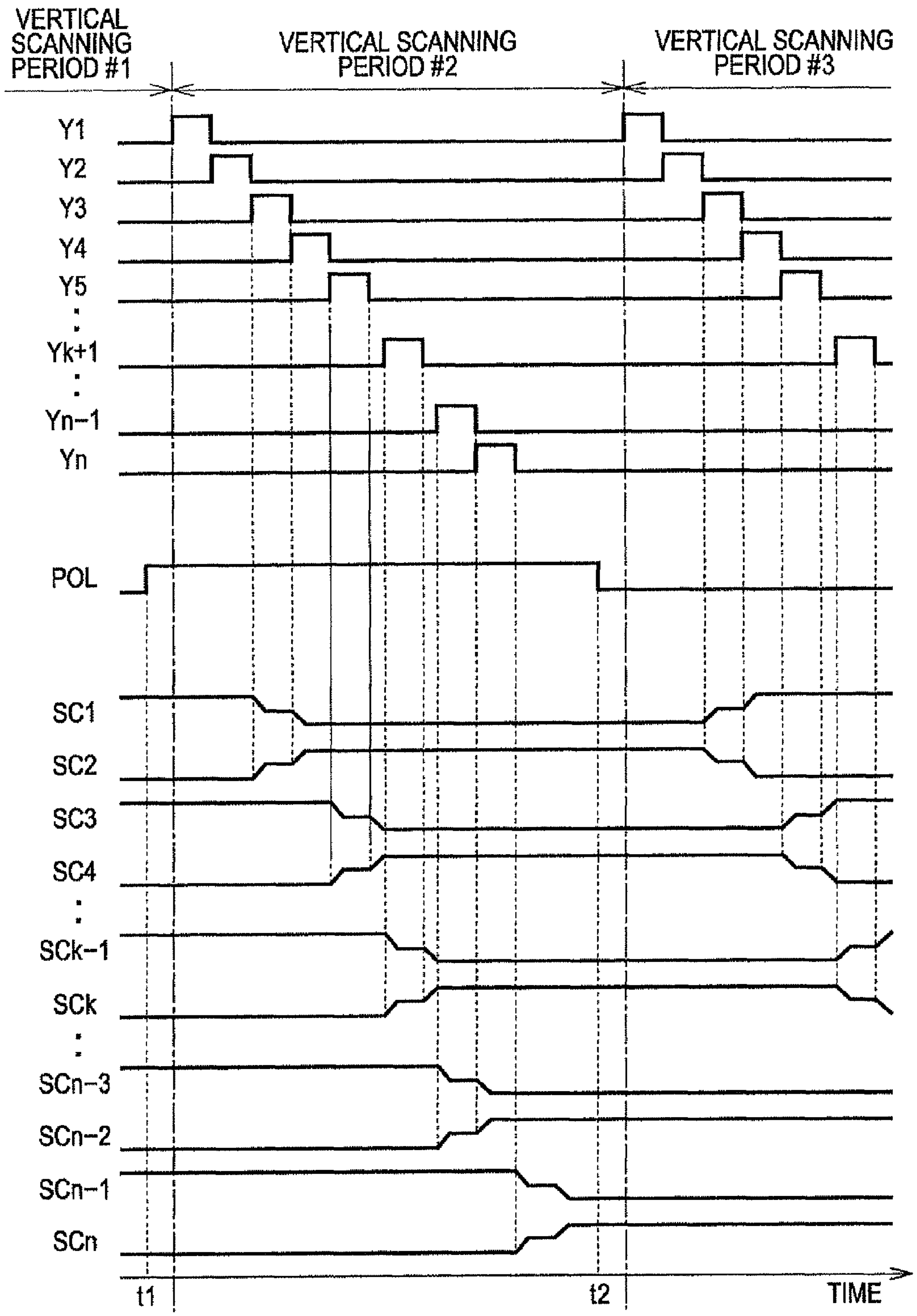
FIG. 8 is a timing chart for the operation of the capacity-line driving circuit.

The above-described operation of the capacity-line driving circuit 110 will be described in more detail with reference to FIG. 8. FIG. 8 is a timing chart for the operation of the capacity-line driving circuit 110.

As shown in FIG. 8, suppose that the polarity signal POL is inverted from a low level to a high level at time t1. Since the polarity signal POL is switched to a high level, capacity lines SCi in odd-numbered rows (i=1, 3, to n−1), to which the first voltage VSCH is supplied during the previous vertical scanning period #1, is supplied with the second voltage VSCL during the following vertical scanning period #2 and capacity lines SCj in even-numbered rows (j=2, 4, to n), to which the second voltage VSCL was supplied during the previous vertical scanning period #1, is supplied with the first voltage VSCH during the following vertical scanning period #2.

Specifically, when the scanning signal of the scanning line Y1 comes to a high level, writing (here, negative-polarity writing) to the 1$^{st}$-row pixel sections 70 is performed, and when the scanning signal of the scanning line Y2 comes to a high level, writing (here, positive-polarity writing) to the $2^{nd}$-row pixel sections 70 is performed.

Thereafter, when the scanning signal of the scanning line Y3 comes to a high level, writing (here, positive-polarity writing) to the $3^{rd}$-row pixel sections 70 is performed and, at the same time, the capacity line SC1 and the capacity line SC2 are electrically connected by the operation of the short-circuit control circuit 113 in the capacity-line driving circuit 110 described above. Thus, the capacity lines SC1 and SC2 each have an intermediate potential. That is, the potential of the capacity line SC1 shifts from the potential of the first voltage VSCH to the intermediate potential, and the potential of the capacity line SC2 shifts from the potential of the second voltage VSCL to the intermediate potential. Thereafter, when the scanning signal of the scanning line Y3 comes to a low level, the capacity line SC1 is supplied with the second voltage VSCL and the capacity line SC2 is supplied with the first voltage VSCH.

Also for the other capacity lines SCk−1 and SCk, when the scanning signal of the scanning line Yk−1 comes to a high level, writing (here, negative-polarity writing) to the k−$1^{th}$-row pixel sections 70 is performed, and thereafter, when the scanning signal of the scanning line Yk comes to a high level, writing (here, positive-polarity writing) to the $k^{th}$-row pixel sections 70 is performed. When the scanning signal of the scanning line Yk+1 comes to a high level, (i) the capacity lines SCk−1 and SCk are electrically connected to each other, so that the potential of the capacity line SCk−1 shifts from the potential of the first voltage VSCH to the intermediate potential and the potential of the capacity line SCk shifts from the potential of the second voltage VSCL to the intermediate potential; and (ii) the inverted polarity signal POL is output as the latch signal LATk, the voltage level signal VOUTk−1 is switched from the first voltage VSCH to the second voltage VSCL, and the voltage level signal VOUTk is switched from the second voltage VSCL to the first voltage VSCH. Thereafter, when the scanning signal of the scanning line Yk+1 comes to a low level, the capacity lines SCk−1 and SCk are electrically disconnected from each other, so that the potential of the capacity line SCk−1 shifts from the intermediate potential to the potential of the second voltage VSCL and the potential of the capacity line SCk shifts from the intermediate potential to the potential of the first voltage VSCH.

The operation in the vertical scanning period #3 after the completion of the operation in the vertical scanning period #2 is substantially the same.

Specifically, when the scanning signal of the scanning line Yk−1 comes to a high level, writing (here, positive-polarity writing) to the k−$1^{th}$-row pixel sections 70 is performed, and thereafter, when the scanning signal of the scanning line Yk comes to a high level, writing (here, negative-polarity writing) to the $k^{th}$-row pixel sections 70 is performed. When the scanning signal of the scanning line Yk+1 comes to a high level, (i) the capacity lines SCk−1 and SCk are electrically connected to each other, so that the potential of the capacity line SCk−1 shifts from the potential of the second voltage VSCL to the intermediate potential and the potential of the capacity line SCk shifts from the potential of the first voltage VSCH to the intermediate potential; and (ii) the inverted polarity signal POL is output as the latch signal LATk, the voltage level signal VOUTk−1 is switched from the second voltage VSCL to the first voltage VSCH, and the voltage level signal VOUTk is switched from the first voltage VSCH to the second voltage VSCL. Thereafter, when the scanning signal of the scanning line Yk+1 comes to a low level, the capacity lines SCk−1 and SCk are electrically disconnected from each other, so that the potential of the capacity line SCk−1 shifts from the intermediate potential to the potential of the first voltage VSCH and the potential of the capacity line SCk shifts from the intermediate potential to the potential of the second voltage VSCL.

Thus, according to this embodiment, the potentials of the capacity lines SC1 to SCn (in other words, the potentials of the second ends of the storage capacitors 119) are inverted from the first voltage VSCH to the second voltage VSCL or from the second voltage VSCL to the first voltage VSCH. Thus, it is enough to consume relatively low power that provides the difference between the intermediate potential and the potential of the first voltage VSCH or the difference between the intermediate potential and the potential of the second voltage VSCL. In other words, there is no need to consume relatively high power that provides the difference between the potential of the first voltage VSCH and the potential of the second voltage VSCL or the difference between the potential of the second voltage VSCL and the potential of the first voltage VSCH. Thus, the configuration of this embodiment can reduce power consumption necessary for writing potentials to the capacity lines SC1 to SCn (for example, to about half) as compared with a configuration in which the potential difference between the first voltage VSCH and the second voltage VSCL or the potential difference between the second voltage VSCL and the first voltage VSCH needs to be applied only through the VSCH line and the VSCL line (that is, a configuration in which the capacity lines SCk−1 and SCk are not short-circuited.

In addition, in this embodiment, the potentials of the capacity lines SC1 to SCn are shifted to a high level (for example, the first voltage VSCH) or a low level (for example, the second voltage VSCL) according to the polarities of the voltages of the image signals supplied to the data lines X1 to Xm. Thus, the potentials of the first ends of the storage capacitors 119 adjacent to the pixel electrodes 9*a* are increased or decreased, and the electric charge increased or decreased is distributed to the liquid crystal elements 118. As a result, the liquid crystal elements 118 are provided with an effective voltage higher than that of the image signals supplied to the data lines X1 to Xm. In other words, the amplitudes of the voltages of the image signals supplied to the data lines X1 to X can be smaller than those applied to the liquid crystal elements 118 via the pixel electrodes 9*a*. This reduces the power consumption.

Furthermore, it is enough to provide one latch circuit 111#*k* (and one voltage selection circuit 112#*k* and one short-circuit control circuit 113#*k*) for the adjacent two capacity lines SCk−1 and SCk. This further reduces the power consumption of the capacity-line driving circuit 110 as compared with a configuration in which the capacitor lines SCk each need one latch circuit 111#*k*. Moreover, this reduces the size of the capacity-line driving circuit 110 itself, thus narrowing the frame area.

(4) Modification

Figure 9:
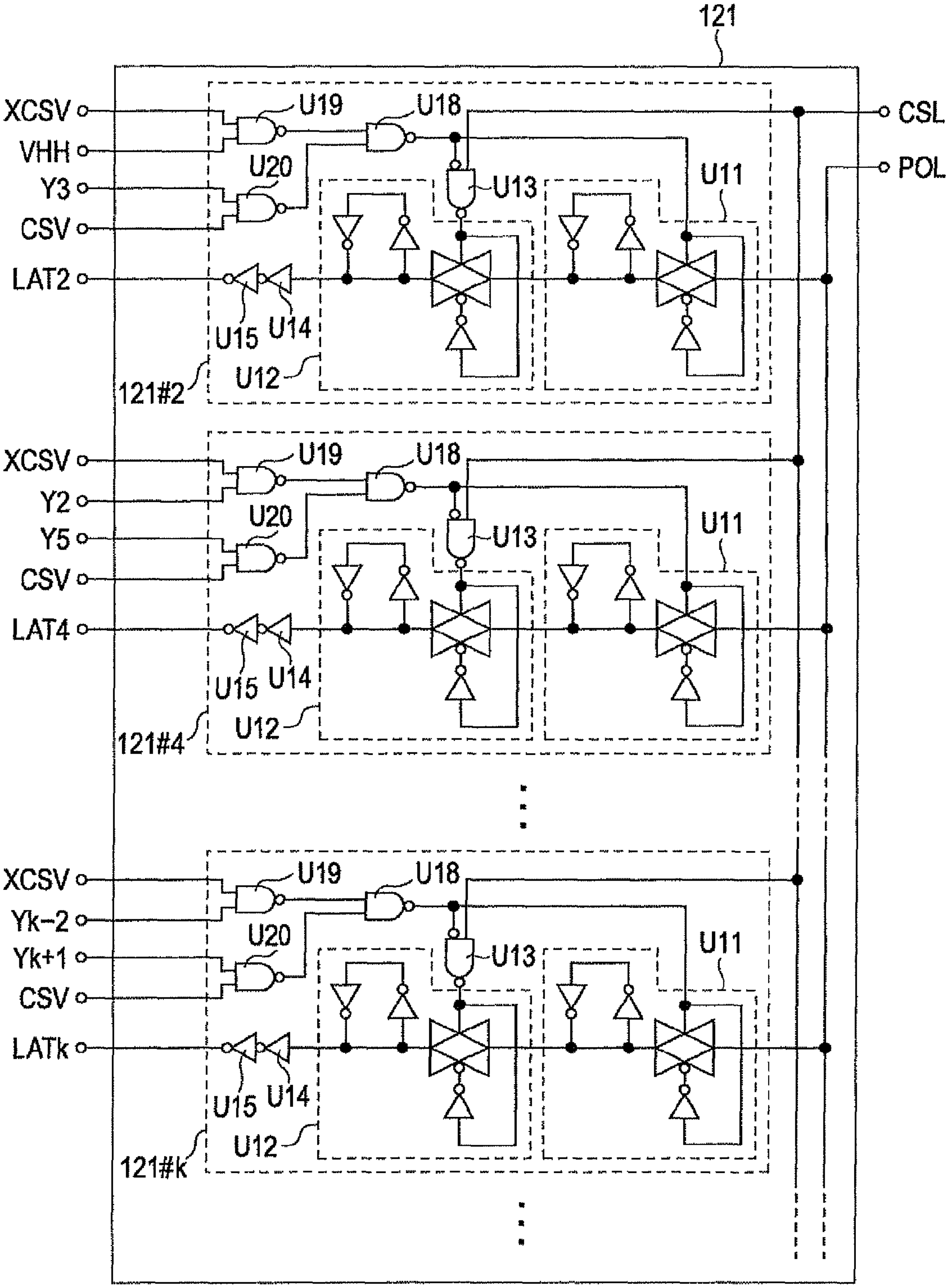
FIG. 9 is a conceptual block diagram showing the configuration of a latch circuit of a capacity-line driving circuit according to a modification.
Figure 10:
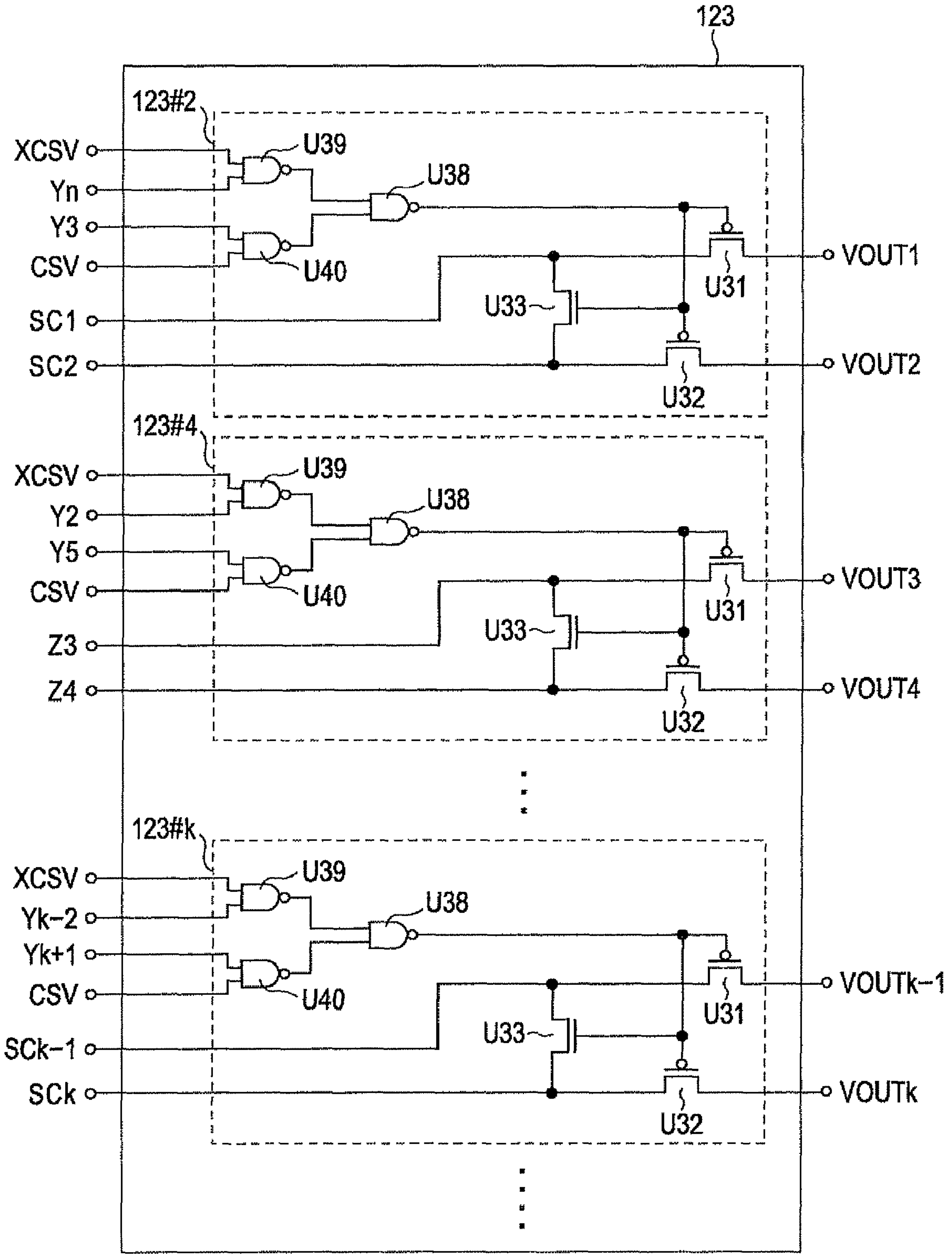
FIG. 10 is a conceptual block diagram showing the configuration of a short-circuit control circuit of the capacity-line driving circuit according to the modification.

Referring next to FIGS. 9 and 10, a modification (a capacity-line driving circuit 120) of the capacity-line driving circuit 110 of the liquid crystal device 100 according to this embodiment will be described. FIG. 9 is a conceptual block diagram showing the configuration of a latch circuit 121 of the capacity-line driving circuit 120 according to the modification. FIG. 10 is a conceptual block diagram showing the configuration of a short-circuit control circuit 123 of the capacity-line driving circuit 120 of the modification. The same components as those of the capacity-line driving circuit 110 are given the same reference signs and their detailed descriptions will be omitted.

As shown in FIG. 9, the latch circuit 121 of this modification includes a latch circuit 121#*k* corresponding to the k−1$^{th}$-row capacity line SCk−1 and the k$^{th}$-row capacity line SCk, where k is an integer that satisfies 2≦k≦n, typically, an even number.

The latch circuit 121#*k* includes a NAND circuit U18, a NAND circuit U19, and a NAND circuit U20, in addition to the components of the latch circuit 111#*k*.

The output of the NAND circuit U18 is input to the latch U11 and the NOR circuit U13. The two input terminals of the NAND circuit U18 are electrically connected to the output terminal of the NAND circuit U19 and the output terminal of the NAND circuit U20, respectively. The two input terminals of the NAND circuit U19 receive an inverted signal XCSV of a scanning-direction control signal CSV and a scanning signal supplied to the scanning line Yk−2, respectively. When k=2 (that is, in the latch circuit 121#2, the output of a high-potential source VHH is input in place of the scanning signal supplied to the scanning line Yk−2. The two input terminals of the NAND circuit U20 receive a scanning signal supplied to the scanning line Yk+1 and the scanning-direction control signal CSV, respectively.

The scanning-direction control signal CSV becomes a high-level signal when the scanning direction is forward (specifically, when scanning signals are supplied from the scanning lines Y1 to Yn in sequence), and becomes a low-level signal when the scanning direction is backward (specifically, when scanning signals are supplied from the scanning lines Yn to Y1 reversely).

When the scanning direction is forward, the output of the NAND circuit U19 is constantly at a high level, and the output of the NAND circuit U20 is an inverted signal of the scanning signal supplied to the scanning line Yk+1. As a result, the output of the NAND circuit U18 becomes the scanning signal supplied to the scanning line Yk+1.

In contrast, when the scanning direction is backward, the output of the NAND circuit U19 is an inverted signal of the scanning signal supplied to the scanning line Yk−2, and the output of the NAND circuit U20 is constantly at a high level. As a result, the output of the NAND circuit U18 is the scanning signal supplied to the scanning line Yk−2.

The above-described configuration of the latch circuit 121 of this modification allows the scanning signals of the subsequent rows in the scanning direction to be specified by each of the latch circuits 121#*k* and allows the polarity signal POL to be taken in at the timing at which a specified scanning signal comes to a high level. This allows the above operation to be performed appropriately irrespective of whether the scanning direction is forward or backward, thus providing the above-described advantages.

As shown in FIG. 10, the short-circuit control circuit 123 of this modification includes a short-circuit control circuit 123#*k* corresponding to the k−1$^{th}$-row capacity line SCk−1 and the k$^{th}$-row capacity line SCk, where k is an integer that satisfies 2≦k≦n, typically, an even number.

The short-circuit control circuit 123#*k* includes a NAND circuit U38, a NAND circuit U39, and a NAND circuit U40, in addition to the components of the short-circuit control circuit 113#*k*.

The output terminal of the NAND circuit U38 is electrically connected to the inverting-input gate terminal of the TFT U31, the inverting-input gate terminal of the TFT U32, and the inverting-input gate terminal of the TFT U33. The two input terminals of the NAND circuit U38 are electrically connected to the output terminal of the NAND circuit U39 and the output terminal of the NAND circuit U40, respectively. The two input terminals of the NAND circuit U39 receive the inverted signal XCSV of the scanning-direction control signal CSV and the scanning signal supplied to the scanning line Yk−2, respectively. The two input terminals of the NAND circuit U39 and the NAND circuit U40 receive a scanning signal supplied to the scanning line Yk+1 and the scanning-direction control signal CSV, respectively.

When the scanning direction is forward, the output of the NAND circuit U39 is constantly at a high level, and the output of the NAND circuit U40 is an inverted signal of the scanning signal supplied to the scanning line Yk+1. As a result, the output of the NAND circuit U38 becomes the scanning signal supplied to the scanning line Yk+1.

In contrast, when the scanning direction is backward, the output of the NAND circuit U39 is an inverted signal of the scanning signal supplied to the scanning line Yk−2, and the output of the NAND circuit U40 is constantly at a high level. As a result, the output of the NAND circuit U38 is the scanning signal supplied to the scanning line Yk−2.

The above-described configuration of the short-circuit control circuit 123 of this modification allows the scanning signals of the subsequent rows in the scanning direction to be specified in each of the short-circuit control circuits 123#*k* and allows the adjacent capacity lines SCk−1 and SCk to be short-circuited at the timing at which a specified scanning signal comes to a high level. This allows the above operation to be performed appropriately irrespective of whether the scanning direction is forward or backward, thus providing the above-described advantages.

(5) Electronic Device

Figure 11:
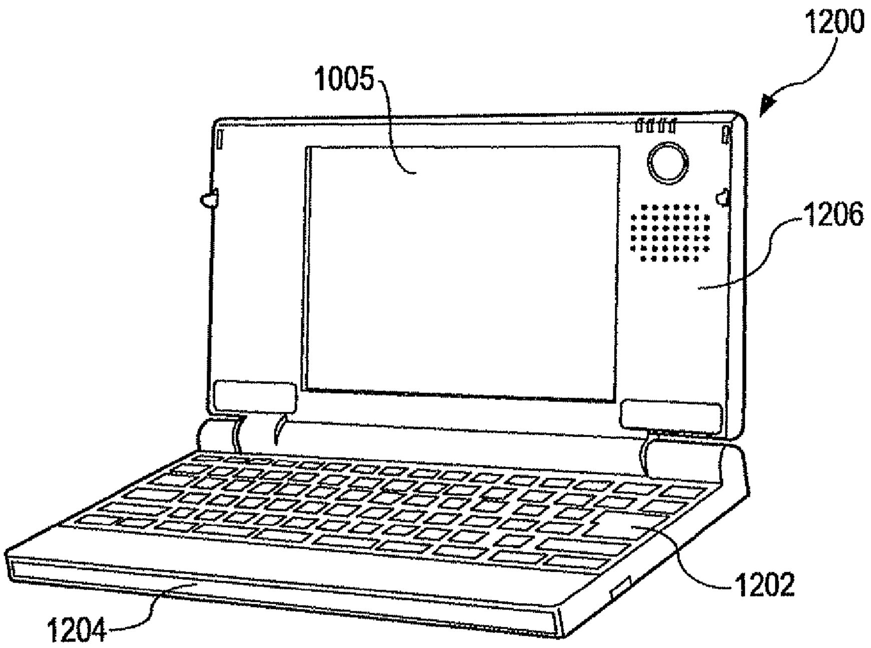
FIG. 11 is a perspective view of a mobile personal computer incorporating the liquid crystal device.
Figure 12:
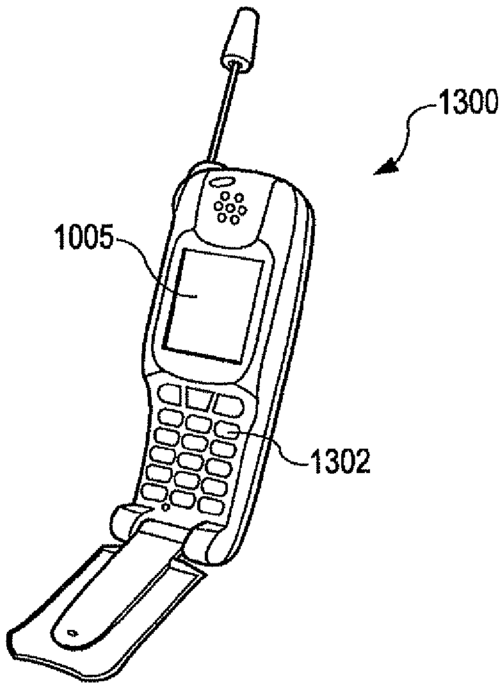
FIG. 12 is a perspective view of a mobile phone incorporating the liquid crystal device.

Referring to FIGS. 11 and 12, examples of an electronic device equipped with the liquid crystal device 100 will be described.

FIG. 11 is a perspective view of a mobile personal computer incorporating the liquid crystal device 100. Referring to FIG. 11, a computer 1200 is composed of a main body 1204 having a keyboard 1202 and a liquid-crystal display unit 1206 including the liquid crystal device 100. The liquid-crystal display unit 1206 has a backlight on the back of the liquid crystal device 100.

An example in which the liquid crystal device 100 is applied to a mobile phone will be described. FIG. 12 is a perspective view of a mobile phone, denoted at 1300, which is an example of the electronic device. Referring to FIG. 12, the mobile phone 1300 includes a plurality of operation buttons 1302 and a semitransparent-reflection-type liquid crystal device 1005 having the same structure as the liquid crystal device 100 described above.

These electronic devices have the above-described advantages because they have the liquid crystal device 100 described above.

Examples of the electronic device are, in addition to the electronic devices described with reference to FIGS. 11 and 12, are liquid-crystal TVs, view-finder or monitor-direct-view videotape recorders, car navigation systems, pagers, electronic notepads, electronic calculators, word processors, work stations, videophones, POS terminals, direct-view display devices having a touch panel, and projection display devices, such as liquid crystal projectors. It is needless to say that the invention can be applied to such various electronic devices.

It is to be understood that the invention is not limited to the above-described embodiments and that various changes and modifications may be made without departing from the sprit and scope as set out in the accompanying claims and the specification; driving systems, electro-optic devices, and electronic devices undergoing such modifications are also within the technical scope of the invention.

The entire disclosure of Japanese Patent Application No. 2007-322916, filed Dec. 14, 2007 is expressly incorporated by reference herein.

What is claimed is:

1. A driving system that drives an electro-optic device including a plurality of pixel electrodes, a counter electrode, a plurality of storage capacitor elements whose first ends are each electrically connected to a corresponding pixel electrode of the plurality of pixel electrodes, and an electro-optic material driven in accordance with an electric field applied between the plurality of pixel electrodes and the counter electrode, the driving system comprising:

a supply circuit that supplies one of a first voltage and a second voltage different from the first voltage to a second end of one or a plurality of first storage capacitor elements of the plurality of storage capacitor elements corresponding to a first horizontal line and supplies the other of the first voltage and the second voltage to a second end of one or a plurality of second storage capacitor elements of the plurality of storage capacitor elements corresponding to a second horizontal line subsequent to the first horizontal line;

a switching circuit that switches, in sequence every predetermined period, each of the voltages to be supplied to the second end of the first storage capacitor element and the second end of the second storage capacitor element from the first voltage to the second voltage or from the second voltage to the first voltage; and a control circuit that electrically connects the second end of the first storage capacitor element and the second end of the second storage capacitor element to each other before the voltage switched by the switching circuit is supplied to the second end of at least one of the first storage capacitor element and the second storage capacitor element; wherein the electro-optic device includes data lines to which image signals are supplied and scanning lines to which scanning signals are supplied in sequence to control the electrical connection between the data lines and the plurality of pixel electrodes, the scanning signal being supplied to every one or more horizontal lines;

the control circuit electrically connects the second end of the first storage capacitor element and the second end of the second storage capacitor element to each other at the timing responsive to the scanning signal supplied to the scanning line corresponding to a third horizontal line subsequent to the second horizontal line;

the switching circuit switches each of the voltages supplied to the second end of the first storage capacitor element and the second end of the second storage capacitor element from the first voltage to the second voltage or from the second voltage to the first voltage so that, in the case where the scanning signal in the selected-state level is supplied to the scanning line corresponding to the first horizontal line, (i) when the potential of the data line corresponds to positive-polarity writing, the switching circuit shifts the potential of the second end of the first storage capacitor element to a high level and shifts the potential of the second end of the second storage capacitor element to a low level after the scanning signal supplied to the scanning line corresponding to the third horizontal line shifts to the non-selected-state level; and (ii) when the potential of the data line corresponds to negative-polarity writing, the switching circuit shifts the potential of the second end of the first storage capacitor element to a low level and shifts the potential of the second end of the second storage capacitor element to a high level after the scanning signal supplied to the scanning line corresponding to the third horizontal line shifts to the non-selected-state level.

2. The driving system according to claim 1, wherein the control circuit electrically disconnects the second end of the first storage capacitor element from the second end of the second storage capacitor element after a lapse of a predetermined time since the voltage supplied to the second end of the first storage capacitor element is switched from the first voltage to the second voltage or from the second voltage to the first voltage.

3. The driving system according to claim 1, wherein the control circuit electrically connects the second end of the first storage capacitor element and the second end of the second storage capacitor element to each other while the scanning signal supplied to the scanning line corresponding to the third horizontal line is at a selected-state level.

4. The driving system according to claim 1, wherein the control circuit electrically disconnects the second end of the first storage capacitor element from the second end of the second storage capacitor element while the scanning signal supplied to the scanning line corresponding to the third horizontal line is at a non-selected-state level.

5. The driving system according to claim 1, wherein the switching circuit is provided one for each set of storage capacitor elements corresponding to adjacent two horizontal lines; and the switching circuit corresponding to the first storage capacitor element and the second storage capacitor element switches each of the voltages supplied from the supply circuit to the second end of the first storage capacitor element and the second end of the second storage capacitor element from the first voltage to the second voltage or from the second voltage to the first voltage at the timing responsive to the scanning signal supplied to the scanning line corresponding to the third horizontal line subsequent to the second horizontal line of the plurality of storage capacitor elements.

6. An electro-optic device comprising the driving system according to claim 1.

7. An electronic device comprising the electro-optic device according to claim 6.

* * * * *